UNITED STATES PATENT OFFICE.

ALFRED B. LAWTHER, OF CHICAGO, ILLINOIS.

IMPROVEMENT IN PROCESSES OF TREATING OLEAGINOUS SEEDS.

Specification forming part of Letters Patent No. 168,164, dated September 28, 1875; application filed March 6, 1875.

CASE A.

*To all whom it may concern:*

Be it known that I, ALFRED B. LAWTHER, of Chicago, in the county of Cook and State of Illinois, have invented a new and Improved Process for Treating Oleaginous Seeds, of which the following is a specification:

The object of my invention is to improve the process of working flaxseed, linseed, and other oil seeds, in such a manner that a greater yield yield of oil is obtained at a considerable saving of time and power in the running of the crushing, mixing, and pressing machines, while also a cake of superior texture is produced.

Hitherto it has been the practice to crush the oil-seeds between revolving rollers, and completing the imperfect crushing by passing them under heavy stones known as edge-runners or mullers, under addition of a quantity of water, the crushed and moistened seed being then taken from the muller-stones and stirred in a heated steam-jacketed reservoir preparatory to being placed into the presses for extracting the oil.

This process has been found imperfect in regard to many points, but mainly on account of the over-grinding of portions of the seed and the husks or bran when the seeds were exposed for too long a time to the action of the muller-stones, so as to form a pasty mass, and produce an absorption of oil by the fine particles of bran, while on the other hand the under grinding, by too short an action of the stones, rendered the presses incapable of extracting the full amount of oil from the seed.

The texture of the cake allows in one case hardly the recognition of the original material, breaking indifferently in all directions, while in the other case it contains uncrushed seeds, causing a loss of oil and of nutritious parts.

My process is intended to remedy the defects of the one at present in use; and consists mainly in conveying the oil-seeds through a vertical supply-tube and feeding-roller at such degree of pressure to powerful revolving rollers that each seed is individually acted upon, and the oil-cells fully crushed and disintegrated. They are then passed directly, without the use of muller-stones, to the mixing-machine, to be stirred, moistened, and heated by the admission of small jets of water or steam to the mass, and then transferred to the presses.

The oil-seeds are by my new process first conveyed to a hopper and fluted feed-roller at the top of an upright feed-tube of the crushing-machine, by which the seeds are fed, under suitable pressure, to revolving rollers of sufficient power, which run at a surface speed of about one hundred and fifty to two hundred feet per minute.

The pressure on the seeds in the feed-tube is necessary, as the oil-seeds would otherwise not feed readily into rollers revolving under great pressure. The oil-seeds are thereby compelled to pass evenly and steadily through the rollers, which have, therefore, a chance to act on all of them, and break the oil-cells uniformly without reducing any portion to a pasty condition. The bran is also left comparatively coarse, so that it shows the nature of the seed after pressing.

The muller-stones, and their over or under grinding of any portion of the seeds, are entirely done away with by this mode, which makes not only the machinery less expensive, but produces also a saving of power required in running the same. The crushed seeds are next placed in a steam-jacketed reservoir of the mixing-machine, where they are stirred, moistened, and heated by perforated revolving stirrer-arms, which throw jets of water or steam into the mass, so as to thoroughly permeate and mix the same. The crushed and moistened mass is then transferred to the presses for the extraction of the oil, which operation requires less power, on account of the uniformity of the mass, produces a greater yield of oil, and furnishes an improved quality of oil-cake or residue, of open-grained flaky nature, capable of being split in regular pieces, at right angles to the direction of pressure.

Having thus described my invention, I claim as new and desire to secure by Letters Patent—

The process of crushing oleaginous seeds and extracting the oil therefrom, consisting of the following successive steps, viz: the crushing of the seeds under pressure, the moistening of the seeds by direct subjection to steam, and, finally, the expression of the oil from the seed by suitable pressure, as and for the purpose set forth.

ALFRED B. LAWTHER.

Witnesses:
JAMES WRIGHT,
CHAS. F. HILLS.